Oct. 13, 1959  J. FREY ET AL  2,908,369
MAGNETICALLY OPERATED DRIVE RELEASE AND BRAKE
Filed July 1, 1954  4 Sheets-Sheet 1

INVENTORS:
JULIUS FREY
JOSEPH OTT
HANS BRINCKMANN
BY Leon M. Straus
AGT

Oct. 13, 1959   J. FREY ET AL   2,908,369
MAGNETICALLY OPERATED DRIVE RELEASE AND BRAKE
Filed July 1, 1954   4 Sheets-Sheet 2

INVENTORS:
JULIUS FREY
JOSEPH OTT
HANS BRINCKMANN
BY Leon M. Strauss
AGT

Oct. 13, 1959    J. FREY ET AL    2,908,369
MAGNETICALLY OPERATED DRIVE RELEASE AND BRAKE

INVENTORS
JULIUS FREY
JOSEPH OTT
HANS BRINCKMANN

2,908,369
Patented Oct. 13, 1959

2,908,369

MAGNETICALLY OPERATED DRIVE RELEASE AND BRAKE

Julius Frey, Eislingen, Wurttemberg, and Joseph Ott and Hans Brinkmann, Goppingen, Wurttemberg, Germany, assignors to L. Schuler A.G., Goppingen, Wurttemberg, Germany Application July 1, 1954, Serial No. 440,794

Claims priority, application Germany July 2, 1953

6 Claims. (Cl. 192—144)

The present invention refers to a magnetically operated drive release and brake, in particular for use in connection with heavy power presses.

In known magnetically operated couplings employable for a different purpose the armature which is controlled by the electromagnet and which initiates the coupling operation generally rotates together with the magnet itself and with the shaft to be coupled. The magnet receives its current through sliding ring contacts. Such coupling is, however, not suitable for presses here under consideration.

In contradistinction to known coupling devices the present invention aims at the construction of an electromagnet which is substantially flat and stationary and has the shape of a pot or cup with a displaceable, but non-rotatable armature covering and closing said cup. Through the armature rotatably extends a bolt operatively connected thereto, so that upon axial movement of the bolt actuation of the coupling takes place, the bolt in this structure being rotatable together with the shaft when coupled therewith. This new construction has various advantages in that the armature, which does not rotate, may be simplified and easily manufactured. The magnet itself is stationary and sliding contacts may be dispensed with.

Furthermore, any auxiliary brakes may be avoided, in particular air or liquid controlled friction brakes or toothed stop segments, as they are conventional in known couplings, in which in view of the rotation of the magnet together with the armature and of other coupling parts relatively large masses have to be subjected to brake effect.

In the present invention, it is sufficient to employ a normally operating brake, such as a lamellae actuated friction brake, in order to stop with sufficient rapidity all rotatable parts in any desired position and further to arrest at the same time the machine upon untimely current interruption.

In a more simplified construction according to the invention the magnet, armature and bolt extend in the direction of the axis of the main drive shaft, e.g. the eccentric shaft. It is preferred that for effectuating the connection or coupling a magnet is employed and for disconnection or uncoupling spring means is employed which are operatively connected to the armature.

It is an object of the invention to provide means offering the possibility of pretensioning the releasing springs by means of adjusting screws, thus effectively regulating rapidity of disconnection of the coupling and also of the brake force, which becomes effective by the brake upon said disconnection or declutching.

It is a further important object of the present invention to provide means enabling adjustment and regulation of the coupling after a predetermined wear of the friction liners, which may be effectuated by an adjustment screw for changing the position of the aforesaid bolt with respect to the armature, whereby the armature may be adjustably displaced so that the same will always take up the same end position, the effective force of attraction of the magnet remaining substantially at equal value.

It is a further object of the present invention to provide means affording the employment of adjustable, annular abutment means behind the lamellae, to thereby define or limit the stroke of the armature during operation or disconnection of the coupling, thereby affording a further possibility of adjusting the armature when said coupling is in open or inoperative position.

Still another object of the present invention is to provide means conducive to easy testing and adjustment of the width or extent of the air gap between the magnet and the armature, an indicator device being proposed, which has a hand connected to the armature and is movable relative to a dial. Such device may be further employed for the purpose of predetermining the air gap between the magnet and the armature, if same is reduced due to wear of the friction liners to an extent more than desirable, whereby the armature would otherwise abut against the magnet.

Still a further object of the present invention is to provide means facilitating regulation of the speed for establishing connection and disconnection of the novel coupling.

The electromagnet is so constructed and the stroke of its armature is so chosen, that the time of response between the closing of the coil circuit and the establishment of connection or operation of the coupling is reduced to a minimum. For that reason according to the invention a magnet is employed which at a given excitation (amperage-turn) has a smaller ratio between the self induction and the ohmic resistance, thus attaining a time constant of relative small value.

It ensues from the aforesaid that the ohmic resistance of the coil or winding must be as large as possible and the self inductance of the coil as small as possible, for instance, by adequate formation of the space for the windings and/or due to the fact that only a few windings are employed. In a given magnet the time of response is shorter the larger the voltage is, which is applied to the coil circuit and at which the required operative intensity is attained.

According to the invention the resistance of the coil circuit may be increased through insertion of a series resistance. When a series resistance is placed into the coil circuit then, according to the invention, the series resistance may be increased to five times the coil resistance.

Regulating circuits may control the coupling, so that upon disconnection the punch or plunger stops immediately in the downward movement and is arrested during its upward movement in its upper dead end position.

In order to extinguish upon disconnection of the circuits and in particular of the electromagnet any arcs between the pairs of contacts provision has been made according to the invention for extinguishing the sparks by placing spark extinguishing condensers parallel to the pairs of contacts. Upon cutting off the inductive circuits there are often observed very high voltage points, which occasionally lead to damage of the insulation or to a short circuit in regard to the spark extinguishing condenser.

In the case of switching-off the contacts for the magnet coil, one or several spark extinguishing condensers may be arranged to which indicator means may be coordinated, for indicating insufficient insulation of condenser layers relative to each other. According to the invention, provision is further made in regard to safety means for cutting off the press operation, if direct current is passed through the condenser.

According to another feature of the invention there are provided within the magnet coil circuit several pairs of contacts in series with each other, preferably three pairs, which will be opened simultaneously upon disconnection of the magnet.

If the switching-off of the electromagnet would be effectuated only by a single pair of contacts, then if the spark quenching or extinguishing condenser of this single pair of contacts is shorted, such pair of contacts for the magnet circuit would not any more interrupt the latter, so that the punch or plunger will operate further on. However, due to the series arrangement of several, such as, for instance, three pairs of contacts, each provided with one spark extinguishing condenser, the aforesaid danger and disadvantage will be overcome.

According to one embodiment of the invention, the circuit for the magnet coil is opened by means of a relay whose pairs of contacts are placed in series in the aforesaid manner. In order that the time which the relay needs for the switching operation will not unduly prolong the period for switching the magnet, it is preferred to switch on the electromagnet not by means of the relay, but via a pair of contacts, which, in accordance with the invention, is additionally placed into the circuit for the magnet coil and serves only the purpose of switching on the magnet coil.

These and other advantages and in particular in regard to the indicator device for the spark extinguishing condensers of the switching-off contacts for the magnet will ensue from the attached specification, claims and drawings, in which:

Figure 1:
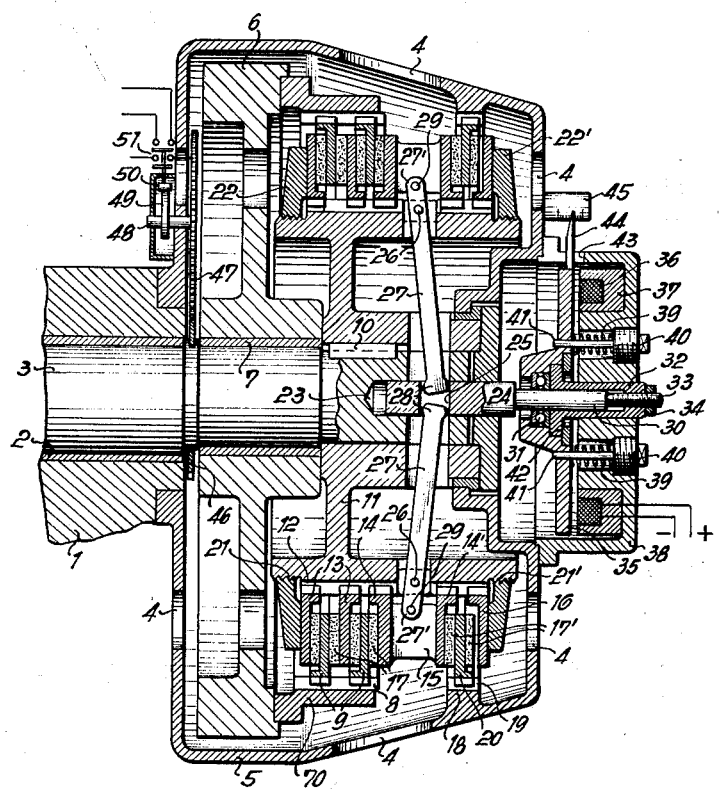
Fig. 1 is a cross-section of an electro-magnetically controlled coupling made in accordance with the invention and for use in a power press.
Figure 2:
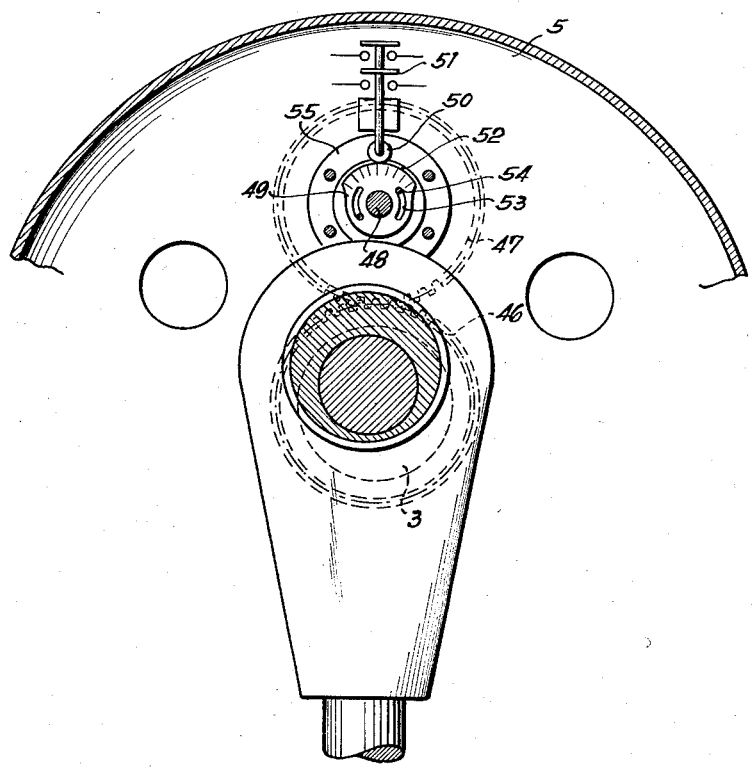
Fig. 2 is a simplified cross-section of the eccentric shaft of the press.
Figure 3:
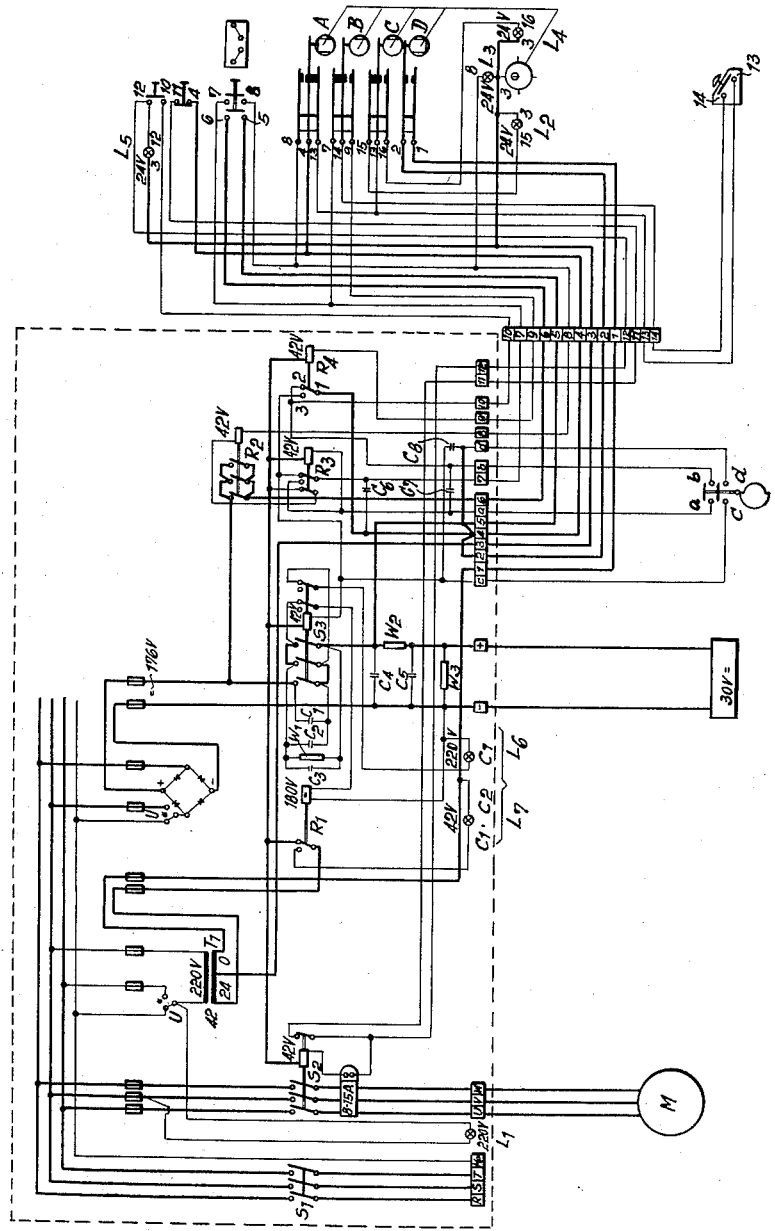
Fig. 3 shows a wiring diagram employable in the circuit for the electro-magnetic coupling made in accordance with the invention.

Referring now more particularly to Fig. 1 of the drawings, there is disclosed a bushing 2 within the body 1 of the press (only a part being depicted) through which an eccentric shaft 3 extends. This shaft projects into a housing 5 which contains the coupling aggregate proper and which is provided with openings or windows 4 for observing or surveying the operation of the coupling. A gear 6 is mounted on shaft 3 for continuous rotational movement during operation, which gear serves as a toothed fly wheel. Gear 6 is rotatably seated on a bushing 7. Shaft 3 is driven in the following manner during the operative position of the coupling:

The gear 6 is provided with a lateral extension rim 70 which carries teeth 8 at the inner circumference. Lamellae 9 are displaceably disposed between teeth 8 and are movable in the direction of the axis of shaft 3.

Further lamellae 13 are disposed on a base gear 11 which is keyed at 10 to shaft 3 for rotation therewith, the base gear 11 being also provided with a toothed rim 12 carrying lamellae 14, 14' and further a pressure ring 15 and displaceable lamella 16. Lamellae 9 project intermediate the lamellae 13, 14. Between each two lamellae there is disposed a friction liner 17. This liner may optionally be fixed to the toothed rim 70 or on the base gear 11. The coupling housing 5 has an extension 18 in which an internal ring gear 19 is positioned in which is also displaceably held a lamella 20. The lamella 20 extends intermediate lamellae 14' and 16.

Frictional liners 17' are disposed intermediate the lamellae which may be fastened to the lamellae supported by base gear 11 or to the lamella 20, disposed on extension 18. All of the lamellae disposed on base gear 11 are secured by means of threaded engagement of ring discs 22, 22' with threads 21, 21', thus preventing outward sliding movement. Through these discs the respective path of the armature 35 is defined or limited, whereby through adjustment of disc 22 care may be taken that the air gap intermediate the armature 35 and the magnet 37 remains substantially constant, so that it may thus be avoided that the armature abuts against the magnet.

Shaft 3 has an axial bore 23 in which there is displaceably disposed a coupling bolt 24. Into transverse bore 25 of bolt 24 link levers 27, 27' extend towards said bolt 24, which levers have pivot pins 26 positioned adjacent the outermost end of said levers. The projecting opposite ends 28 of said levers are somewhat enlarged and rounded. The outermost ends of said levers are operatively connected to press ring 15 at 29. The arms 27 of said link levers (up to pivots 26) are considerably longer than the arms 27' (from pivots 26 to outermost ends) thereof, so that during the translating movement of bolt 24 (in axial direction of shaft 3) against press ring 15 a considerably large transfer ratio is attainable.

Bolt 24 has a stepped down or reduced portion 30 and a further projecting portion 33 which is threaded. A bushing 32 movable with bolt portion 30 is seated on bolt portion 33 and through displacement with its flange against armature 35 facilitates adjustment of the position of the bolt 24 relative to the armature 35.

A counter screw 34 secures the adjusted position of the bushing 32 relative to bolt 24 and bolt portion 30 which rotate in unison during the coupling operation. The flange end of bushing 32 abuts against roller bearing 31. A sufficiently large opening in armature 35 affords rotational movement of the flange of bushing 32, whereby said armature may be displaced or attracted by means of a flat cupped magnet which encloses coil or winding 36 and a magnet ring 37 as main parts. Thus bolt 24 and bushing 32 may be displaced by said armature, as it is well understood. A cover 38 which has a central opening forming a passageway in which rotatable bushing 32 is supported, is attached to housing 5 and is engaged by screw members 40. Springs 39 which abut against said screw members 40 and extend between the latter and armature 35 surround pins 41, the latter passing through and guiding armature 35. Pins 41 are held in axial bores of screw members 40, which form abutments for the pins 41, whereby action of springs 39 as seen in Fig. 1, causes movement of the armature 35 upon disconnection of the coupling operation and limits such movement toward the left side away from magnet 36, 37.

The operation of the coupling structure may be briefly summarized as follows:

Flywheel 6 and toothed extension rim 70 forming a first gear are continuously power driven within coupling housing 5. Base gear 11, forming a second gear is keyed to drive shaft 3 at 10. Connection between said first and said second gears is established by means of toothed lamellae 9, 13, 14 and upon pressing of the latter against each other and against portion 22 of said second gear due to energization of the electromagnetic means. This causes movement of armature 35 towards the electromagnet 36, 37 as a consequence of which bushing 32 and bolt member 24 are displaced toward the right (in Fig. 1), so that interconnecting means 27, 27' operatively connected to said member 24, exert suitable pressure through ring 15 against said lamellae and friction disks assembly 13, 14 and 17. Thus, the first gear 70 becomes engaged with second gear 11 and couples flywheel 6 to drive shaft 3.

Upon deenergization of the electromagnetic means armature 35 will be moved a predetermined stroke by spring means 39 from the electromagnet 36, 37, whereby bolt member 24 is axially displaced toward the left (Fig. 1) and swings interconnecting means 27, so that pressure ring 15 now exerts pressure towards the right against lamellae 14', 16, 17' and 20, thereby bringing about a braking effect of the second gear 11 at toothed rim 18, 19 within coupling housing 5 along with disconnection of the second gear from the first gear.

On armature 35 there is attached a hand or pointer 44 passing through an opening 43 in cover 38 for cooperation with a dial 45 positioned on the outside wall of housing 5, whereby the respective position of the armature 35 may be perceived.

Through this indicator device the respective position of the armature 35 and the width of the air gap may be properly adjusted and observed. The magnet may be so adjusted by rotating bushing 32 along threads 33 on bolt 24, 30 so that the attracted armature 35 assumes a minimum position without hitting or abutting the magnet element 37 which accommodates spool or winding 36. The counter-screw 34 ensures precision adjustment of bushing 32 on said threads 33.

Shaft 3 carries a pinion 46 which meshes with a gear 47 having the same number of teeth. On shaft 48 of gear 47 is seated a cam disk 49 which is adjustable with respect to its angular position. This cam disk 49 has elongated slots 53 through which screw bolts 54 extend, which are connected with a disk 55 which, in turn, is fixedly connected with shaft 48. Thus, the extent of adjustment is limited by the length of the slots 53. Through cam disk 49 which is in engagement with a follower roller 50 switch 51 is actuated, which is connected to the magnet circuit, elevation 52 of cam disk 49 in conjunction with roller 50 causing closing of switch 51 within said circuit.

Referring now further to the electrical wiring diagrams, there are disclosed a transformer $T_1$ for feeding the control circuit and a rectifier $G_1$ for feeding the winding or coil of the magnet coil circuit. Main switch $S_1$ places the transformer $T_1$ and rectifier $G_1$ on voltage and may be switched through bridges U to 220 volts and 380 volts for operation. A single lamp $l_1$ is lit when the main switch $S_1$ is closed.

The motor M for the press is switched on through a relay $S_2$ (Fig. 4) whose main contact switch means are connected to the feed line or main of the motor M and has further a secondary contact $s_{2n}$ which is included in its own exciter circuit.

In the feed line of the motor M is further included a thermo relay $B_1$ whose contact interrupts the excitation circuit for the relay $S_2$ and thus automatically switches off the current for the motor M, if a sufficiently high current passes through the feed line, for instance, when the press is overloaded or in the case of a short circuit in the motor. The feed line for the motor, as well as the input and output of the transformer $T_1$ and of the rectifier $G_1$ are fused.

The secondary winding of the transformer $T_1$ whose ends are designated with 0 and 42 has a tap 24 at which the lamps $L_2$, $L_3$, $L_4$ which indicate the position of the selector switch A, B, C, D which functions as a locking switch, signal lamp $L_5$ being lit, as long as the motor relay $S_2$ is under voltage.

Figure 4:
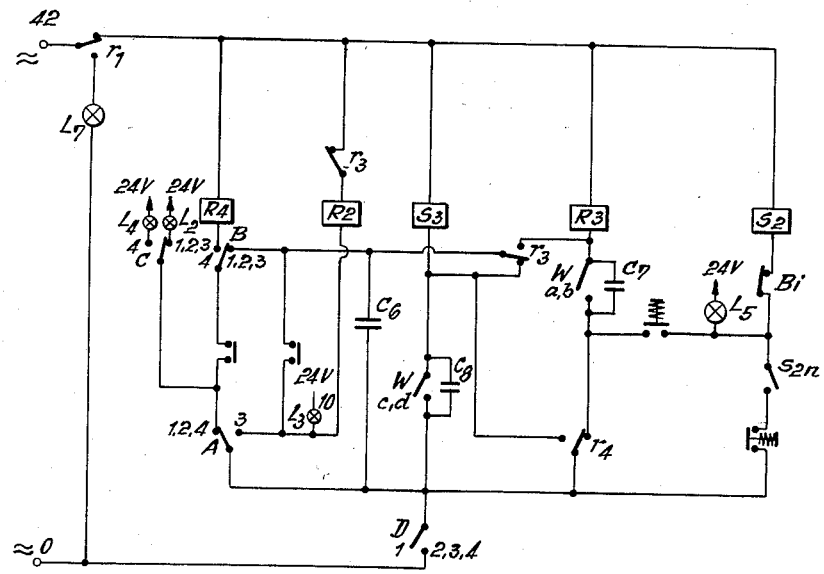
Fig. 4 illustrates a wiring diagram for the control circuit.

The selector switch comprises four contact arms which may be actuated to assume different switching positions, namely, "off" (1), single foot-operated stroke (2), single hand-operated stroke (3) and foot-operated continuous operation (4). In Fig. 4 the switch positions are indicated at the contacts A, B, C, D in arabic numbers, whereby the respective contact arm rests on the corresponding contact. The selector switch may be locked in all four switching positions by means of a key, so that changes may not take place by unauthorized persons.

The terminal 42 of the secondary winding of the transformer $T_1$ is directly connected through a changeover switch $r_1$ with one end of the exciter winding of the (alternating current A.-C.) relay $R_3$, $R_4$ and the relay $S_2$ and $S_3$, while the corresponding lead to relay $R_2$ further contains a working or operative contact $r_3$. The end 0 of the secondary winding of the transformer $T_1$ is connected with the contact D of the selector switch and further through lamp $L_7$ with the operative position of the changeover contact $r_1$. In the switch positions 2, 3 and 4 contact D is closed, so that terminal 0 on the contact arm of the changeover contact A of the selector switch rests on the control barrel switch contact $w_{cd}$, on the arm of the change-over contact $r_4$ and over the rest position of the closed switch "off" to the operative or working contact $s_{2n}$. The contact arm of switch A connected with switch D is in the positions 1, 2 and 4 of the selector switch connected with the open foot-operated switch in position of rest thereof and further with the contact arm of switch C which in switching position 1, 2 and 3 is connected with lamp $L_2$ and in the switching position 4 of the selector switch with the lamp $L_4$. The other side of the foot-operated contact is connected with the contact arm of the changeover switch B which in switching position 4 of the selector switch is connected further with the other terminal of the winding of the relay $R_4$. In the switching position 3 contact arm of switch A is connected directly with the other end of the exciter winding of the relay $R_2$ and is further connected with the open hand-operated switch, when in rest position, and with the lamp $L_3$.

The contact arm of switch B is connected in positions 1, 2, 3 with the other side of the hand-operated switch and with the contact arm of the changeover contact $r_3$, whose resting position is connected with the exciter winding of the relay $S_3$, the other side of the barrel contact $w_{cd}$ and the operative position of the changeover contact $r_4$. From the operative position of the changeover contact $r_3$ conduits lead to the other end of relay winding $R_3$ and also to the barrel contact $w_{ab}$. At the resting position of the changeover contact $r_4$ the other side of the barrel contact $w_{ab}$ and the open "on"-switch are in resting position. The other terminal of the "on"-switch is connected through a resting contact of the thermo relay B, with the other end of the winding of the relay $S_{2n}$, with lamp $L_5$ and with the operative contact $S_{2n}$.

Figure 5:
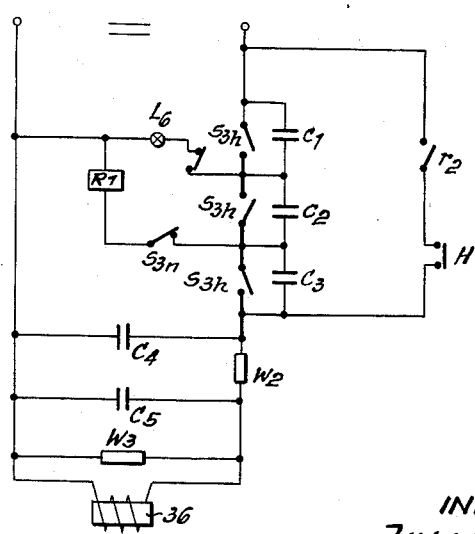
Fig. 5 shows a wiring diagram for the circuit in which the magnet coil or winding is included.

The condensers $C_6$, $C_7$, $C_8$ function as spark quenching condensers. The winding circuit for the magnet illustrated in Fig. 5 is connected to the rectifier $G_1$ whose one outlet terminal is directly connected with the magnet winding 36. Parallel to the magnet winding is displayed a resistance $W_3$ and equalising condensers $C_4$ and $C_5$, whereby between the latter condensers a series resistance $W_2$ is placed into the main of the magnet winding, whose resistance is adjustable.

In the embodiment herein disclosed the series resistance is not depicted as being adjustable, so that the series resistance may not be changed by an unauthorized operator, thus any damage may be prevented which could be caused if the series resistance would be changed without simultaneously changing the operating voltage. The most favorable time of response of the magnet is attained, if the resistance $W_2$ is approximately five times as large as ohm's resistance of the winding 36 of the magnet. The terminal of the resistance $W_2$ is connected with the terminal of the rectifier $G_1$ over three successively switched main contacts $s_{3h}$ of the relay $S_3$ (Fig. 5) which may be simultaneously opened for switching off the magnet. Parallel to the relay contact $3_h$ there is disposed a branch which includes an operative contact $r_2$ and a hand-operated main switch H, which is open in its resting position and is in series with said operative contact $r_2$. Parallel to each singular contact $s_{3h}$ are disposed spark quenching condensers $C_1$, $C_2$ and $C_3$.

The device which indicates poor insulation of the condensers $C_1$ and $C_2$ consists of two leads, which branch off between the first and the second and between the second and the third series-connected contacts $s_{3h}$ and lead to the other let-in wire for the magnet winding. Each branch contains a resting contact $s_{3n}$, the auxiliary contacts of the relay $S_3$ and the successively positioned main contacts $s_{3h}$ which are closed. The one branch further contains a lamp $L_6$, the other branch further containing the exciter winding of the relay $R_1$.

The indicator device and the safety means operate as follows:

As soon as the insulation of the condenser $C_1$ becomes insufficient, then the lamp $L_6$ coordinated to condenser $C_1$ and resting contact $s_{3n}$, receives a voltage and becomes incandescent as a red warning light. The press still can operate without being endangered, even if condenser $C_3$ would additionally become defective. If in addition to defective condenser $C_1$ the insulation of condenser $C_2$ becomes insufficient, then relay $R_1$ while contacts $s_{3n}$ are open, will be energized over $C_1$ and $C_2$ and the resting contact $s_{3n}$.

As a consequence thereof, the changeover contact $r_1$ cuts off the control circuit and lamp $L_7$ serving as a warning light, is placed into the circuit.

The operation of the control of the coupling will now be described, whereby it is assumed that the plunger or punch is arrested in its upper dead end position, so that contacts $w_{ab}$ and $w_{cd}$ will be open.

At the "off" position (first position) of the selector switch, the control circuit will be cut off through contact D, the relay $S_2$ and $S_3$ are not under current and consequently also the circuit including the winding of the magnet and of the motor M.

In the positions, 2, 3 and 4 of the selector switch, motor M may be switched on upon pressing push button "on." After this push button is pressed relay $S_2$ will be excited through $b_1$, so that the motor circuit will be closed. Besides this, relay $S_2$ closes its auxiliary contact $s_{2n}$, so that it is maintained in position through its own contact and the switch push button "off."

If the push button "off" is pressed, then the exciter circuit for the relay $S_2$ will be interrupted. The relay $S_2$ thus dropped, will open the circuit for the motor and also the auxiliary contact $s_{2n}$, so that the exciter circuit remains open, after the "off" switch push button is released.

At the position "foot-operated single stroke" (second position) of the selector switch, upon pressing of the foot switch over A, B, $r_3$ the relay $S_3$ will be energized, so that the current circuit for the magnet is closed and the coupling becomes operative to establish connection. Upon coupling connection the control barrel 49 will be entrained and is rotated, so that contacts $w_{ab}$ and $w_{cd}$ close during the ascending movement of the press punch.

Thus, relay $R_3$ will be energized through $r_4$, so that the changeover switch $r_3$ will be energized through $r_4$ so that the changeover switch contact $r_3$ interrupts the connection of the relay $S_3$ to the foot-control contact, whereby relay $S_3$ remains energized through the contact $w_{cd}$. Relay $R_3$ will only drop, when the barrel contact $w_{ab}$ is opened and consequently, when the press punch takes up in its upper dead end position. Relay $S_3$ can only be energized, when relay $R_3$ is dropped, namely, in resting position of contact $r_3$. Thus it will be prevented that the coupling will be again actuated, before the punch of the press is arrested.

For the hand-operated single stroke position (third position) of the selector switch, there is included instead of foot-operated switch, a hand-operated switch in the exciter circuit of the relay $S_3$. Upon closing of the hand-operated switch the same operation occurs as herein described in reference to second position. In addition thereto, however, relay $R_2$ will be energized through A and resting contact $R_3$, whereby relay $R_2$ closes contact $r_2$ in the magnet circuit. Upon closing of the hand-switch the winding or coil of the magnet will be directly energized through $r_2$ and H, $W_2$, so that the switching time of the relay $S_r$ will not delay the time of response of the magnet.

The resting contact $R_3$ is opened upon excitation of the relay $R_2$, so that it will be again avoided that the coupling would become effective for connection, before the punch takes up the position of rest.

At the switch position "foot-operated continuous operation" (fourth position) of the selector switch relay $R_4$ upon pressing of the foot switch over A, B, will be energized which switches on relay $S_3$ directly to the operative side of the switch over contact $r_4$. Relay $S_3$ remains energized, as long as the foot-operated switch is pressed or actuated. During all three switching positions 2, 3, 4 upon release of the foot- or hand-operated switch the coupling will immediately disconnect upon downward movement of the punch, during the ascending or upward movement of the punch, however, only when the control barrel contact $w_{cd}$ is open and when said punch has reached its upper dead end position.

Since the push button switch of the motor relay $S_2$ works over resting contact $r_4$, it will thus be effectively prevented, that in "continuous operation" position motor M can be switched on, while the coupling is in operation.

Various changes and modifications may be made without departing from the spirit and scope of the present invention and it is intended that such obvious changes and modifications be embraced by the annexed claims.

Having thus described the invention, and what is claimed as new and desired to be secured by Letters Patent is:

1. A coupling structure for use in connection with the drive shaft of a heavy power press, comprising drive means co-axially arranged with respect to said drive shaft and including a first driven gear, a second gear keyed to said drive shaft, engageable means arranged to establish operative connection of said second gear with and disconnection of the latter from said first gear, operable means including electromagnetic means having an armature and an electromagnet, said operable means including a member co-axially arranged with respect to said drive shaft and displaceable lengthwise of the axis thereof, and first means interconnecting said member with said armature, and second means interconnecting said member with a portion of said second gear through said engageable means and adapted to exert pressure thereagainst for connecting said second gear to said first gear upon energization of said electromagnetic means, whereby said member is axially displaced by said armature through said first means and said second means moved to a position establishing said connection, whereas upon deenergization of said electromagnetic means said armature is moved away from said electromagnet, while said first and second interconnecting means are moved to release said pressure against said portion of said second gear and to establish said disconnection of said second gear from said first gear, said first mean forming a bushing fixed to one end of and adjustable relative to said member, said bushing being disposed for actuation by said armature and being rotatably supported relative thereto, said second means being swingably supported in said member adjacent another end thereof.

2. A coupling structure according to claim 1, said engageable means including a first lamellae assembly extending between said first gear and said second gear, a second lamellae assembly extending between said second gear and a toothed rim provided within a housing enclosing said coupling, and pressure ring means connected to said second interconnecting means and positioned adjacent said first lamellae assembly.

3. A coupling structure according to claim 2, including a coupling housing, brake means positioned in said coupling housing and extending to another portion of said second gear, whereby upon deenergization of said electromagnetic means said second interconnecting means through corresponding displacement of said member actuates said pressure ring means against said second lamellae assembly.

4. In a coupling, which has an electric circuit including an electro-magnet and a coil therefor and electrical contact means for actuation of said electro-magnet; cam disk means operatively connected with said shaft and displaceable relative thereto, follower means operatively engaging said cam disk means, said electrical contact means being connected to and operated by said follower means, so that when the said follower means has reached its extreme point of movement said electrical contact means will actuate said electro-magnet, first gear means on said shaft, second gear means adapted to operatively engage said first gear means, and shaft means carried by said second gear means, said cam disk means being coupled with said shaft means and being angularly adjustable relative to said shaft to thereby regulate the position of said cam disk means relative to said follower means for predetermining the time of actuation of said electro-magnet, and an electrical series resistance in series connection with said coil winding of said magnet, the electrical resistance of said series resistance being five times as great as that of the coil winding of said magnet.

5. In a coupling according to claim 4, said series resistance having a constant coefficient of resistance.

6. A magnetically operated coupling comprising a main drive shaft, an electro-magnet constituted by a substantially flat, stationary cupped magnet, a displaceable, non-rotatable armature cooperable with said magnet, a bolt rotatably supported in said armature and whose axial movement actuates the coupling, gear means including lamellae therebetween to effectuate coupling connection between said gear means, and means operatively connected to said bolt and operable in one direction of said axial movement of said bolt to establish coupling connection between said gear means, whereby said bolt is rotatably joined to the drive shaft upon establishing said coupling connection, means for adjusting the armature relative to said bolt to thereby afford the same end position of said armature relative to said magnet, said adjusting means including a bushing, and set screw means acting upon said bolt and said bushing to position the latter relative to said armature, and indicator means associated for indicating an adjustment position of said armature relative to said magnet and for determining the air gap therebetween, said indicator means including a pointer connected to said armature and extending outside of said housing, and a dial positioned outside of said housing, said pointer cooperating with said dial.

References Cited in the file of this patent

UNITED STATES PATENTS

| | | |
|---|---|---|
| 1,993,413 | Mellon | Mar. 5, 1935 |
| 2,203,024 | Lewis et al. | June 4, 1940 |
| 2,277,554 | McCoy | Mar. 24, 1942 |
| 2,302,838 | Bundy | Nov. 24, 1942 |
| 2,382,765 | Zahodiakin | Aug. 14, 1945 |
| 2,465,829 | Ancet | Mar. 29, 1949 |
| 2,516,010 | Marbury | July 18, 1950 |
| 2,528,316 | Mayo | Oct. 31, 1950 |
| 2,600,667 | Mason | June 17, 1952 |
| 2,639,796 | Dean | May 26, 1953 |
| 2,675,507 | Geiger | Apr. 13, 1954 |
| 2,728,431 | Keck | Dec. 27, 1955 |